United States Patent
Maehata et al.

(10) Patent No.: US 10,196,538 B2
(45) Date of Patent: Feb. 5, 2019

(54) THERMOSETTING POWDER COATING MATERIAL AND COATED ARTICLE

(71) Applicant: FUJI XEROX CO., LTD., Tokyo (JP)

(72) Inventors: Hideo Maehata, Kanagawa (JP); Susumu Yoshino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 336 days.

(21) Appl. No.: 14/810,971

(22) Filed: Jul. 28, 2015

(65) Prior Publication Data

US 2016/0280953 A1    Sep. 29, 2016

(30) Foreign Application Priority Data

Mar. 26, 2015  (JP) .................... 2015-065233

(51) Int. Cl.
*C09D 133/00* (2006.01)
*C09D 167/00* (2006.01)
*C09D 133/06* (2006.01)

(52) U.S. Cl.
CPC ....... *C09D 167/00* (2013.01); *C09D 133/066* (2013.01)

(58) Field of Classification Search
CPC ..... C09D 5/031–5/033; C09D 133/066; C09D 167/00; C08L 33/066; C08L 67/00
See application file for complete search history.

(56) References Cited

U.S. PATENT DOCUMENTS

| | | | | |
|---|---|---|---|---|
| 4,957,814 A * | 9/1990 | Barbee | ............... | C08G 18/4222 428/402 |
| 5,719,230 A * | 2/1998 | Ando | ............... | C08G 77/42 525/29 |
| 5,898,043 A * | 4/1999 | Uemae | ............... | C09D 5/031 428/407 |
| 6,121,408 A * | 9/2000 | Aoki | ............... | C09D 5/03 427/185 |
| 6,194,525 B1 * | 2/2001 | Ortiz | ............... | B29C 37/0032 428/482 |
| 6,239,215 B1 * | 5/2001 | Morita | ............... | C09D 5/031 525/64 |
| 6,822,022 B2 * | 11/2004 | Koike | ............... | C09D 133/14 523/332 |
| 2003/0153713 A1 * | 8/2003 | Spyrou | ............... | C08G 18/1875 528/48 |
| 2009/0253827 A1 * | 10/2009 | Mukai | ............... | C08J 3/126 523/201 |

FOREIGN PATENT DOCUMENTS

| | | |
|---|---|---|
| JP | H10-338823 A | 12/1998 |
| JP | H11-140379 A | 5/1999 |
| JP | H11-166133 A | 6/1999 |
| JP | H11-193357 A | 7/1999 |
| JP | 2000-109728 A | 4/2000 |

OTHER PUBLICATIONS

Nov. 13, 2018 Office Action issued in Japanese Patent Application No. 2015-065233.

* cited by examiner

*Primary Examiner* — Alexandre F Ferre
(74) *Attorney, Agent, or Firm* — Oliff PLC

(57) ABSTRACT

A thermosetting powder coating material includes powder particles that include a core which contains a thermosetting resin and a thermosetting agent having a blocked isocyanate group and a resin coating portion which contains a thermosetting resin having a glass transition temperature of equal to or higher than 45° C. and coats a surface of the core, and satisfy the followings (1) to (4): (1) a volume particle diameter distribution index GSDv of the powder particles is equal to or less than 1.50; (2) an average circularity of the powder particles is equal to or greater than 0.96; (3) a melting temperature of the powder particles measured according to a ½ method by using a flow tester is from 90° C. to 115° C.; and (4) an exothermic peak is within a range of from 80° C. to 150° C. in a differential scanning calorimetry measurement of the powder particles.

17 Claims, No Drawings

THERMOSETTING POWDER COATING MATERIAL AND COATED ARTICLE

CROSS-REFERENCE TO RELATED APPLICATIONS

This application is based on and claims priority under 35 USC 119 from Japanese Patent Application No. 2015-065233 filed Mar. 26, 2015.

BACKGROUND

1. Technical Field

The present invention relates to a thermosetting powder coating material and a coated article.

2. Related Art

In recent years, since a small amount of volatile organic compounds (VOC) is discharged in a coating step and a powder coating material which is not attached to a material to be coated may be collected and reused after the coating, a powder coating technology using a powder coating material is given attention from the viewpoint of a global environment. Accordingly, various powder coating materials are being investigated.

SUMMARY

According to an aspect of the invention, there is provided a thermosetting powder coating material including powder particles that include:

a core which contains a thermosetting resin and a thermosetting agent having a blocked isocyanate group, and a resin coating portion which contains a thermosetting resin having a glass transition temperature of equal to or higher than 45° C. and coats a surface of the core, and satisfy the followings (1) to (4):

(1) a volume particle diameter distribution index GSDv of the powder particles is equal to or less than 1.50;

(2) an average circularity of the powder particles is equal to or greater than 0.96;

(3) a melting temperature of the powder particles measured according to a ½ method by using a flow tester is from 90° C. to 115° C.; and (4) an exothermic peak is within a range of from 80° C. to 150° C. in a differential scanning calorimetry measurement of the powder particles.

DETAILED DESCRIPTION

Hereinafter, the exemplary embodiment of the invention will be described. These descriptions and examples are intended to illustrate the exemplary embodiment and are not intended to limit the scope of the invention.

Thermosetting Powder Coating Material

The thermosetting powder coating material (hereinafter, referred to as a "powder coating material") in the exemplary embodiment includes a powder particle which has a core including a thermosetting agent having a thermosetting resin and a blocked isocyanate group and a resin coating portion which includes a thermosetting resin having a glass transition temperature of equal to or higher than 45° C., and coats the surface of the core, and satisfies the followings (1) to (4).

(1) A volume particle diameter distribution index GSDv is equal to or less than 1.50.

(2) An average circularity is equal to or greater than 0.96.

(3) The melting temperature measured by a ½ method by using a flow tester is from 90° C. to 115° C.

(4) An exothermic peak is within a range from 80° C. to 150° C. in a differential scanning calorimetry (DSC).

Hereinafter, the melting temperature measured through the ½ method by using the flow tester is simply referred to as a "melting temperature" in some cases.

With such a configuration, the powder coating material according to the exemplary embodiment forms a coating film which is excellent in the smoothness and has the sufficient coating film strength even when the powder coating material is burned at a low temperature (for example, equal to or lower than 150° C., and preferably equal to or lower than 130° C.), and is excellent in storage properties. The reason for this is considered to be as follows.

In coating performed by using the powder coating material, there is a tendency that as the particle size distribution of the powder particles constituting the powder coating material is spread (that is, a large amount of coarse particles and fines are included) or the powder particles are irregular, the smoothness of the coating film which is formed by heating (burning) the powder coating material is deteriorated. The reason for this is considered to be the following mechanism.

If there are a number of coarse particles in the powder particles, irregularities are formed on the surface of the coating film due to the coarse particles, and thus it is likely that the smoothness of the coating film is deteriorated.

If there are a number of fines in the powder particles, the fluidity of the powder particle is deteriorated, and the powder particles are likely to be aggregated to each other (blocking), and thus it is likely that the smoothness of the coating film is deteriorated.

If the powder particles are irregular, the fluidity of the powder particle is deteriorated, and the powder particles are likely to be aggregated to each other, and thus it is likely that the smoothness of the coating film is deteriorated. Further, if the powder particles are irregular, when attaching on the surface to be coated, the number of voids between the powder particles is increased, and thus irregularities are formed on the surface of the coating film after heating. Therefore, it is likely that the smoothness of the coating film is deteriorated.

In this regard, in the powder coating material according to the exemplary embodiment, the volume particle diameter distribution index GSDv of the powder particle is set to be equal to or less than 1.50, and the average circularity of the powder particle is set to equal to or greater than 0.96. In other words, the particle size distribution of the powder particle is made to be smaller, the coarse particles and the fines are made to be less, and the shape of the powder particle is set to be formed into an approximately spherical shape. Due to these, it is possible to prevent the aforementioned problems and improve the smoothness of the coating film.

In addition, in the powder coating material according to the exemplary embodiment, the melting temperature, which is measured through the ½ method by using the flow tester, of the powder particle constituting the powder coating material is set to be from 90° C. to 115° C.

By setting the melting temperature of the powder particle is equal to or lower than 115° C., even when the powder coating material is burned at the low temperature, the powder particle is rapidly melted, the fluidity of the powder particle is well, and therefore, it is possible to obtain the excellent smoothness of the coating film to be formed, and the excellent coating film strength with the progress of the reaction.

On the other hand, when the melting temperature of the powder particle is equal to or higher than 90° C., the storage properties when transporting the coating material powder are improved, and it is possible to prevent the generation of "dripping" of the coating material at the time of the burning.

Further, in the powder coating material according to the exemplary embodiment, the exothermic peak of the powder particle constituting the powder coating material is within a range from 80° C. to 150° C. in the DSC.

If the exothermic peak is within the above-described temperature range in the DSC, it means that in the blocked isocyanate group in the thermosetting agent included in the powder coating material, the blocking agent is decomposed and an active isocyanate group is regenerated in the above-described temperature range. For this reason, in the powder coating material according to the exemplary embodiment, even when the powder coating material is burned at the low temperature, the thermosetting reaction is smoothly performed and thus the smoothness of the coating film to be formed is excellent.

Accordingly, the powder coating material according to the exemplary embodiment forms a coating film which is excellent in the smoothness and has the sufficient coating film strength even when the powder coating material is burned at the low temperature.

On the other hand, when the melting temperature of the powder particle is equal to or lower than 115° C., a phenomenon (hereinafter, referred to as "bleed") in which an inclusion (a thermosetting agent, a colorant, a leveling agent, a flame retardant, or the like) in the powder particle is deposited on the surface of the powder particle is likely to occur. When the bleed is formed, the powder particles are likely to be aggregated to each other (blocking), and thus the storage properties of the powder coating material are deteriorated.

Thus, in the powder coating material according to the exemplary embodiment, a particle including a thermosetting resin and a thermosetting agent (that is, a particle which functions as a powder coating material) is set to be the core, and the resin coating portion including the thermosetting resin of which the glass transition temperature is equal to or higher than 45° C. is provided on the surface of the core. In the above-described powder coating material, since the resin coating portion functions as a partition so as to prevent the inclusion included in the core from bleeding to the surface of the powder particle, it is possible to prevent the powder particles from being aggregated to each other, and thus the storage properties of the powder coating material are improved.

Further, in the powder coating material according to the exemplary embodiment, the glass transition temperature of the thermosetting resin included in the resin coating portion is set to be equal to or higher than 45° C. That is, the glass transition temperature of the thermosetting resin constituting the surface of the powder particle is equal to or higher than 45° C., and due to this, it is possible to prevent the powder particles from being aggregated to each other and thus the storage properties of the powder coating material are improved even when the powder coating material is stored at a relatively high temperature.

With the above-described mechanism, it is assumed that the powder coating material according to the exemplary embodiment forms a coating film which is excellent in the smoothness and has the sufficient coating film strength even when the powder coating material is burned at a low temperature and is excellent in storage properties.

Hereinafter, the powder coating material according to the exemplary embodiment will be described in detail.

The powder coating material according to the exemplary embodiment may be a transparent powder coating material (a clear coating material) which does not include a colorant in the powder particle, or a colorant powder coating material which includes the colorant in the powder particle.

The powder coating material according to the exemplary embodiment includes the powder particle, and may include an external additive attached on the surface of the powder particle. The powder coating material according to the exemplary embodiment is desired to include the external additive attached on the surface of the powder particle in order to improve the fluidity.

Powder Particle

The powder particle includes the core and the resin coating portion coating the surface of the core. That is, the powder particle is a particle having a core/shell structure.

Features of Powder Particle

From the viewpoints of the smoothness of the coating film, the volume average particle diameter D50v of the powder particle is preferably from 1 μm to 25 μm, is more preferably from 2 μm to 20 μm, is even more preferably from 2 μm to 15 μm, and is most preferably from 3 μm to 10 μm.

From the viewpoints of smoothness of the coating film and the storage properties of the powder coating material, the volume particle diameter distribution index GSDv of the powder particle is equal to or less than 1.50, is preferably equal to or less than 1.40, and is more preferably equal to or less than 1.30.

From the viewpoints of the smoothness of the coating film, the average circularity of the powder particle is equal to or greater than 0.96, is preferably equal to or greater than 0.97, and is more preferably equal to or greater than 0.98.

Here, the volume average particle diameter D50v and the volume particle diameter distribution index GSDv of the powder particles are measured using MULTISIZER II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkylbenzene sulfonate) as a dispersant. The obtained material is added to from 100 ml to 150 ml of the electrolyte.

The electrolyte in which the sample is suspended is subjected to a dispersion treatment using an ultrasonic disperser for 1 minute, and a particle diameter distribution of particles having a particle diameter from 2 μm to 60 μm is measured by COULTER MULTISIZER II using an aperture having an aperture diameter of 100 μm. Moreover, 50,000 particles are sampled.

Cumulative distributions by volume are drawn from the side of the smallest diameter with respect to particle diameter ranges (channels) separated based on the measured particle diameter distribution. The particle diameter when the cumulative percentage becomes 16% is defined as a volume average particle diameter D16v, while the particle diameter when the cumulative percentage becomes 50% is defined as a volume average particle diameter D50v. Furthermore, the particle diameter when the cumulative percentage becomes 84% is defined as a volume average particle diameter D84v. Furthermore, the volume average particle diameter distribution index (GSDv) is calculated as (D84v/D16v) ½.

The average circularity of powder particles is measured by using a flow-type particle image analyzer "FPIA-3000 (manufactured by Sysmex Corporation)". Specifically, from 0.1 ml to 0.5 ml of a surfactant (alkylbenzene sulfonate) as a dispersant is added to from 100 ml to 150 ml of water in which solid impurities are removed in advance, and from 0.1 g to 0.5 g of a measurement sample is added thereto. The suspension in which the measurement sample is dispersed is subjected to a dispersion treatment using an ultrasonic disperser for from 1 minute to 3 minutes, and the concentration of the dispersion is made to be from 3,000 particles/μl to 10,000 particles/μl. A measurement of the average circularity of powder particles is performed on the dispersion using a flow-type particle image analyzer.

The average circularity of powder particles is a value obtained by determining the circularity (Ci) of each particle of n particles measured with respect to the powder particles and calculating by the following equation. Here, in the following equation, Ci represents a circularity (=perimeter of a circle equal to the projected area of a particle/perimeter of the particle projected image), and fi represents a frequency of the powder particles.

$$\text{Average circularity of powder particles (Ca)} = \left(\sum_{i=1}^{n}(Ci \times fi)\right) \bigg/ \sum_{i=1}^{n}(fi) \quad \text{Equation 1}$$

From the viewpoint of forming the coating film excellent in the smoothness even when the powder coating material is burned at the low temperature, the melting temperature of the powder particle measured through the ½ method by using the flow tester is from 90° C. to 115° C., is preferably from 95° C. to 110° C., and is more preferably from 100° C. to 105° C.

The melting temperature of the powder particle is measured through the ½ method by using the flow tester which is FLOW TESTER CFT-500 manufactured by Shimadzu Corporation. As for the sample to be measured, 1050 mg of the powder particles which are compacted to be formed into a pellet shape is used. The measurement is performed under the conditions; a load is 10 kgf, the temperature rises from 65° C. to 150° C. at a temperature rising rate of 1° C./min, a die caliber is 0.5 mm, and a die size is 1.0 mm. The melting temperature which is measured through the ½ method by using the flow tester is the temperature of the midpoint of an outflow initiation temperature and an outflow termination temperature at which the sample is melted and outflows.

From the viewpoint that the thermosetting coating film can be formed even when the powder coating material is burned at the low temperature, the exothermic peak of the powder particle is within the range from 80° C. to 150° C. in the DSC. The exothermic peak of the powder particle is preferably within the range from 85° C. to 140° C., and is more preferably within the range from 90° C. to 130° C.

Specifically, the exothermic peak in the DSC is determined by obtaining a DSC curve which is measured by raising the temperature from −10° C. to 200° C. at the temperature rising rate of 10° C./min by using DSC-60A manufactured by Shimadzu Corporation. As for the sample to be measured, 10 mg of the powder particles without any treatment are used.

Core

The core includes a thermosetting agent including the thermosetting resin and the blocked isocyanate group. The core may include other additives such as the colorant.

Thermosetting Resin

The thermosetting resin is a resin having a thermosetting reactive group. Examples of the thermosetting resin include various types of the powder particles of the powder coating material which are used in the related art.

The thermosetting resin may be a water-insoluble (hydrophobic) resin. When a water-insoluble (hydrophobic) resin is used as the thermosetting resin, environmental dependence of charging characteristics of the powder particles (the powder particles) is reduced. In addition, in a case where the powder particles are manufactured by an aggregation and coalescence method, also from the viewpoint of obtaining emulsification dispersion in an aqueous medium, the thermosetting resin may be a water-insoluble (hydrophobic) resin. Moreover, water-insolubility (hydrophobicity) means that the dissolution amount of an object substance with respect to 100 parts by weight of water at 25° C. is less than 5 parts by weight.

The thermosetting resin included in the core is preferably at least one type selected a group consisting of the thermosetting polyester resin and the thermosetting (meth)acrylic resin, and is more preferably a thermosetting polyester resin.

Thermosetting Polyester Resin

The thermosetting polyester resin is, for example, a polycondensation material obtained by polycondensating at least polybasic acid with polyol. The introduction of a curing reactive group to the thermosetting polyester resin is performed by adjusting an amount of the polybasic acid with the polyol to be used when synthesizing the polyester resin. With this adjustment, a thermosetting polyester resin including at least one of a carboxyl group and a hydroxyl group as the curing reactive group is obtained. The curing reactive group is preferably a group having the active hydroxyl group, in the exemplary embodiment, a resin including the hydroxyl group in a molecule (preferably at a molecular terminal) is preferable as the thermosetting polyester resin.

Examples of the polybasic acid include a terephthalic acid, an isophthalic acid, a phthalic acid, a methyl terephthalic acid, a trimellitic acid, a pyromellitic acid, and anhydride of these acids; a succinic acid, an adipic acid, an azelaic acid, a sebacic acid, and anhydrides of these acids; a maleic acid, an itaconic acid, and anhydrides of these acids; a fumaric acid, a tetrahydrophthalic acid, a methyltetrahydrophthalic acid, a hexahydrophthalic acid, a methylhexahydrophthalic acid, or anhydrides of these acids; a cyclohexane dicarboxylic acid, a 2,6-naphthalene dicarboxylic acid, and the like.

Examples of polyol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxyethyl terephthalate, cyclohexanedimethanol, octanediol, diethylpropane diol, butylethylpropane diol, 2-methyl-1,3-propane diol, 2,2,4-trimethylpentane diol, hydrogenated bisphenol A, an ethylene oxide adduct of hydrogenated bisphenol A, a propylene oxide adduct of hydrogenated bisphenol A, trimethylolethane, trimethylolpropane, glycerin, pentaerythritol, tris-hydroxyethyl isocyanurate, hydroxy pivalyl hydroxy pivalate, and the like.

The thermosetting polyester resin may be obtained by polycondensing polybasic acid and a monomer other than polyol.

Examples of the other monomer include a compound including both a carboxyl group and a hydroxyl group in one molecule (for example, dimethanol propionic acid and hydroxy pivalate), a monoepoxy compound (for example, glycidyl ester of branched aliphatic carboxylic acid such as "CARDURA E10 (manufactured by Shell)"), various monohydric alcohols (for example, methanol, propanol, butanol, and benzyl alcohol), various monobasic acids (for example, benzoic acid and p-tert-butyl benzoate), various fatty acids (for example, castor oil fatty acid, coconut oil fatty acid, and soybean oil fatty acid), and the like.

The structure of the thermosetting polyester resin may be a branched structure or a linear structure.

Thermosetting (Meth)Acrylic Resin

The thermosetting (meth)acrylic resin is a (meth)acrylic resin including a thermosetting reactive group. For the introduction of the thermosetting reactive group to the thermosetting (meth)acrylic resin, a vinyl monomer including a thermosetting reactive group may be used. The vinyl monomer including a thermosetting reactive group may be a (meth)acrylic monomer (a monomer containing a (meth) acryloyl group), or may be a vinyl monomer other than the (meth)acrylic monomer.

Examples of the thermosetting reactive group of the thermosetting (meth)acrylic resin include a carboxyl group, a hydroxyl group, an amide group, an amino group. As the thermosetting reactive group of the (meth)acrylic resin, an active hydroxyl group is preferable, and as the thermosetting (meth)acrylic resin in the exemplary embodiment, a resin including at least one type selected from a group consisting of the carboxyl group is preferable, and a resin including the hydroxyl group in the molecule is more preferable.

As examples of the vinyl monomer having the carboxyl group include various types of carboxylic acids (for example, a (meth)acrylic acid, a crotonic acid, an itaconic acid, a maleic acid, and a fumaric acid); various monoesters of α,β-unsaturated dicarboxylic acids and monohydric alcohol with the carbon atoms of 1 to 18 (for example, monomethyl fumarate, monoethyl fumarate, monobutyl fumarate, monoisobutyl fumarate, mono tert-butyl fumarate, monohexyl fumarate, monooctyl fumarate, mono 2-ethylhexyl fumarate, monomethyl maleate, monoethyl maleate, monobutyl maleate, monoisobutyl maleate, mono tert-butyl maleate, monohexyl maleate, monooctyl maleate, mono 2-ethylhexyl maleate; and various monoalkyl ester itaconates (for example, monomethyl itaconate, monoethyl itaconate, monobutyl itaconate, monoisobutyl itaconate, monohexyl itaconate, monooctyl itaconate, and mono 2-ethylhexyl itaconate).

Examples of the vinyl monomer including a hydroxyl group as the thermosetting reactive group include various types of hydroxyl group-containing (meth)acrylates (for example, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono (meth)acrylate, and polypropylene glycol mono(meth)acrylate), an addition reaction product of the various types of hydroxyl group-containing (meth)acrylates and ε-caprolactone, the various types of hydroxyl group-containing vinyl ethers (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), an addition reaction product of the various hydroxyl group-containing vinyl ethers and ε-caprolactone, various hydroxyl group-containing allyl ethers (for example, 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), an addition reaction product of the various hydroxyl group-containing allyl ethers and ε-caprolactone, and the like.

Examples of the acrylic monomer which does not include a thermosetting reactive group which is a configuration unit of the thermosetting (meth)acrylic resin include alkyl ester (meth)acrylate (for example, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth) acrylate, dodecyl (meth)acrylate, isodecyl (meth)acrylate, lauryl (meth)acrylate, and stearyl (meth)acrylate), various aryl ester (meth)acrylates (for example, benzyl (meth)acrylate, phenyl (meth)acrylate, and phenoxyethyl (meth)acrylate), various alkyl carbitol (meth)acrylates (for example, ethyl carbitol (meth)acrylate), other various (meth)acrylate esters (for example, isobornyl (meth)acrylate, dicyclopentanyl (meth)acrylate, dicyclopentenyl (meth)acrylate, dicyclopentenyloxyethyl (meth)acrylate, and tetrahydrofurfuryl (meth)acrylate), various amino group-containing amide unsaturated monomers (for example, N-dimethylaminoethyl (meth)acrylamide, N-diethylaminoethyl (meth)acrylamide, N-dimethylaminopropyl (meth)acrylamide, and N-diethylamino propyl (meth)acrylamide), various dialkylaminoalkyl (meth)acrylates (for example, dimethylaminoethyl (meth) acrylate and diethylaminoethyl (meth)acrylate), various amino group-containing monomers (for example, tert-butylaminoethyl (meth)acrylate, tert-butylaminopropyl (meth) acrylate, aziridinylethyl (meth)acrylate, pyrrolidinylethyl (meth)acrylate, and piperidinylethyl (meth)acrylate), and the like.

In the thermosetting (meth)acrylic resin, other vinyl monomers not including the curing reactive group may be copolymerized, in addition to the (meth)acrylic monomer.

Examples of the other vinyl monomer include various α-olefins (for example, ethylene, propylene, and butene-1), various halogenated olefins except for fluoroolefin (for example, vinyl chloride and vinylidene chloride), various aromatic vinyl monomers (for example, styrene, α-methyl styrene, and vinyl toluene), various diesters of unsaturated dicarboxylic acid and monohydric alcohol having 1 to 18 carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (for example, maleic anhydride, itaconic anhydride, citraconic anhydride, (meth)acrylic anhydride, and tetrahydrophthalic anhydride), various phosphoric acid ester group-containing monomers (for example, diethyl-2-(meth) acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (for example, γ-(meth)acryloyloxypropyl trimethoxy silane, γ-(meth)acryloyloxypropyl triethoxy silane, and γ-(meth) acryloyloxypropyl methyldimethoxy silane), various aliphatic vinyl carboxylate (for example, vinyl acetate, vinyl propionate, vinyl butyrate, vinyl isobutylate, vinyl caproate, vinyl caprylate, vinyl caprate, vinyl laurate, branched aliphatic vinyl carboxylate having 9 to 11 carbon atoms, and vinyl stearate), various vinyl esters of carboxylic acid having a cyclic structure (for example, vinyl cyclohexane carboxylate, vinyl methylcyclohexane carboxylate, vinyl benzoate, and vinyl p-tert-butyl benzoate), and the like.

As the thermosetting polyester resin, an amount of the active hydroxyl group is preferably from $2.5 \times 10^{-4}$ mol/g to $1.5 \times 10^{-3}$ mol/g and the number average molecular weight is preferably from 3,500 to 7,000, and the amount of the active hydroxyl group is more preferably from $3.5 \times 10^{-4}$ mol/g to $9.0 \times 10^{-4}$ mol/g and the number average molecular weight is more preferably from 4,000 to 6,000.

As the thermosetting (meth)acrylic resin, it is preferable that the amount of the active hydroxyl group is from $2.5 \times 10^{-4}$ mol/g to $1.5 \times 10^{-3}$ mol/g and the number average molecular weight is 3,500 to 7,000, and it is more preferable that the amount of the active hydroxyl group is from $3.5 \times 10^{-4}$ mol/g to $9.0 \times 10^{-4}$ mol/g and the number average molecular weight is 4,000 to 6,000.

In the thermosetting polyester resin and the thermosetting (meth)acrylic resin, when the amount of the active hydroxyl group and the number average molecular weight are is within the above-described range, it is easy to control the melting temperature of the powder particle to be within a range from 90° C. to 115° C.

The amount of the active hydroxyl group of the thermosetting resin is measured through a general neutralization test method such as potential difference titration based on JIS K2501.

The number average molecular weight and the weight average molecular weight of the thermosetting resin are measured by using gel permeation chromatography (GPC). The molecular weight measurement by GPC is performed with a tetrahydrofuran (THF) solvent using a GPC, HLC-8120 manufactured by Tosoh Corporation as a measurement device and a column, TSKgel Super HM-M (15 cm) manufactured by Tosoh Corporation. The weight average molecular weight and the number average molecular weight are calculated using a calibration curve of molecular weight created with a monodisperse polystyrene standard sample from results of this measurement.

From the viewpoint that the smoothness of the coating film is excellent even when the powder coating material is burned at the low temperature, the glass transition temperature (Tg) of the thermosetting resin which is included in the core is preferably equal to or lower than 60° C., is more preferably equal to or lower than 57° C., and even more preferably 55° C.

The glass transition temperature (Tg) of the thermosetting resin is obtained by a DSC curve which is obtained by a differential scanning calorimetry (DSC), and more specifically, is obtained by "Extrapolating Glass Transition Starting Temperature" disclosed in a method for obtaining the glass transition temperature of "Testing Methods for Transition Temperatures of Plastics" in JIS K-7121-1987.

The thermosetting resin may be used alone or in combination of two or more types thereof.

The content of the thermosetting resin in the core is preferably from 20% by weight to 99% by weight, and is more preferably from 30% by weight to 95% by weight based on the core.

Other Resins

The core may include a non-curable resin. Here, the ratio of the non-curable resin with respect to the entire resin in the core is preferably equal to or less than 5% by weight and is more preferably equal to or less than 1% by weight, from the viewpoint of the improvement of the curing density (cross-linking density) of the coating film. However, it is preferable that the non-curable resin is not substantially included in the core, and the thermosetting resin is only included in the core.

When the core includes the non-curable resin, the non-curable resin is preferably at least a type selected from a group consisting of a polyester resin and a (meth)acrylic resin.

Thermosetting Agent Having Blocked Isocyanate Group

In the exemplary embodiment, examples of the thermosetting agent including the blocked isocyanate group include a compound having the isocyanate group which is protected by a blocking agent and an uretdione-bonded type isocyanate compound.

The compound having the isocyanate group which is protected by the blocking agent is preferably a compound in which the blocking agent is decomposed and an active isocyanate group is regenerated in the temperature range from 80° C. to 150° C.

In addition, the uretdione-bonded type isocyanate compound is preferably a compound in which an uretdione group is decomposed and an active isocyanate group is regenerated in the temperature range from 80° C. to 150° C.

Example of the isocyanate compound constituting the compound having the isocyanate group which is protected by the blocking agent include organic diisocyanate, a polymer of the organic diisocyanate (a polymer including isocyanurate-type polyisocyanate compound), an adduct of polyol to the organic diisocyanate, an adduct of a low-molecular weight polyester resin to the organic diisocyanate (for example, polyester polyol), or an adduct of water to the organic diisocyanate. Here, examples of the organic diisocyanate include various aliphatic diisocyanates (for example, hexamethylene diisocyanate and trimethyl hexamethylene diisocyanate), and various alicyclic diisocyanates (for example, xylylene diisocyanate and isophorone diisocyanate), various aromatic diisocyanates (for example, tolylene diisocyanate and 4,4'-diphenylmethane diisocyanate).

Examples of the blocking agent of the isocyanate group include methyl ethyl ketoxime, ε-caprolactam, 3,5-dimethylpyrazole, and diethyl malonate.

Among these, the compound having the isocyanate group protected by the blocking agent is preferably a compound which is obtained by being into block the various isocyanate compounds with an oxime compound (referred to as an "oxime blocked isocyanate compound").

As the oxime blocked isocyanate compound, specifically, a compound which includes isophorone diisocyanate as the isocyanate and methyl ethyl ketoxime as the blocking agent is preferable.

The uretdione-bonded type isocyanate compound is preferably an adduct derived from, for example, isophorone diisocyanate and polyalcohol.

Examples of available commercial products of the thermosetting agent having the blocked isocyanate group include VESTANAT B1358, VESTAGON BF1540, and VESTAGON EP-BF9030 manufactured by Evonik, and DESMODUR BL4265SN manufactured by Sumika Bayer Urethane Co., Ltd.

The thermosetting agent having the blocked isocyanate group may be used alone or in combination of two or more types thereof.

The content of the thermosetting agent having the blocked isocyanate group is preferably from 10% by weight to 40% by weight, and is more preferably from 15% by weight to 25% by weight with respect to the thermosetting resin of the core.

Other Thermosetting Agents

The core may include other thermosetting agents in addition to the thermosetting agent having the blocked isocyanate group. Here, the ratio of other thermosetting agents with respect to the entire thermosetting agent in the core is preferably equal to or less than 5% by weight and is more preferably equal to or less than 1% by weight, from the viewpoint that the coating film has the excellent smoothness even when the powder coating material is burned at the low temperature. However, it is preferable that the curable resin is not substantially included in the core, and the thermosetting agent included in the core is only a thermosetting agent including the blocked isocyanate group.

When the core includes other thermosetting agents, the aforementioned other thermosetting agent is selected in accordance with the type of the curing reactive group of the thermosetting resin. Other thermosetting agents may be used alone or in combination of two or more types thereof.

When the curing reactive group of the thermosetting resin is a carboxyl group, specific examples of the thermosetting agent include various epoxy resins (for example, polyglycidylether of bisphenol A), an epoxy group-containing acrylic resin (for example, glycidyl group-containing acrylic resin), various polyglycidylethers of polyol (for example, 1,6-hexanediol, trimethylol propane, and trimethylol ethane), various polyglycidylesters of polycarboxylic acid (for example, phthalic acid, terephthalic acid, isophthalic acid, hexahydrophthalic acid, methyl hexahydrophthalic acid, trimellitic acid, and pyromellitic acid), various alicyclic epoxy group-containing compounds (for example, bis(3,4-epoxy cyclohexyl) methyl adipate), hydroxy amide (for example, triglycidylisocyanurate and β-hydroxyalkyl amide), and the like.

When the curing reactive group of the thermosetting resin is a hydroxyl group, examples of the thermosetting agent include aminoplast, and the like.

Bismuth Catalyst and Tin Catalyst

It is preferable that the core includes at least a type selected from a group consisting of the bismuth catalyst and the tin catalyst as a catalyst prompting the thermosetting reaction. It is possible to reduce a heating time (a burning time) for forming a coating film by including the aforementioned catalysts. In addition, curing density (cross-linking density) of the coating film is improved by including the aforementioned catalysts, and thus it is possible to forma coating film which is excellent in strength such that damage, for example, peeling off is not likely to occur on the coating film when being scratched or being contact with the solvent.

As the bismuth catalyst, for example, K-KAT XC-B221, K-KAT 348, and K-KAT XK-640 which are manufactured by Kusumoto Chemicals, Ltd may be used.

As the tin catalyst, for example, NEOSTANN U-100 and NEOSTANN U-200 manufactured by Nitto Kasei Co., Ltd., and UL-22 manufactured by Momentive Performance Materials Inc. may be used.

From the viewpoint of the stability of the reaction, the catalyst is preferably the bismuth catalyst rather than the tin catalyst.

The total content of the bismuth catalyst and the tin catalyst with respect to the entire powder particles is preferably from 0.3% by weight to 5% by weight, and is more preferably from 0.5% by weight to 4% by weight.

The content of the catalyst in the powder particle is measured through X-ray fluorescence analysis (XRF). Specifically, for example, first, the resin and the catalyst are mixed with each other, and a resin mixture having a well-known concentration of the catalyst is obtained. A pellet sample is obtained with 200 mg of this resin mixture by using a tableting tool having a diameter of 13 mm. The weight of this pellet sample is precisely weighed, and the fluorescent X-ray intensity of the pellet sample is measured to obtain peak intensity. In the same manner as described above, the measurement is performed for the pellet sample with the changed added amount of the catalyst, and a calibration curve is created with the results. The quantitative analysis of the content of the catalyst in the powder particle to be a measurement target is performed by using this calibration curve.

Colorant

As a colorant, a pigment is used, for example. As the colorant, a pigment and a dye may be used in combination.

Examples of a pigment include an inorganic pigment such as iron oxide (for example, colcothar), titanium oxide, titanium yellow, zinc white, white lead, zinc sulfide, lithopone, antimony oxide, cobalt blue, and carbon black; an organic pigment such as quinacridone red, phthalocyanine blue, phthalocyanine green, permanent red, Hansa yellow, indanthrene Blue, Brilliant Fast Scarlet, and benzimidazolones yellow; and the like.

In addition, as the pigment, a brilliant pigment is also used. Examples of the photoluminescent pigment include metal powder such as a pearl pigment, aluminum powder, stainless steel powder; metallic flakes; glass beads; glass flakes; mica; and flake-shaped phosphorus iron oxide (MIO).

The colorant may be used alone or in combination of two or more types thereof.

The content of the colorant is determined depending on types of the pigment, and the hue, brightness, and the depth required for the coating film. The content of the colorant is, for example, preferably from 1% by weight to 70% by weight and more preferably from 2% by weight to 60% by weight, with respect to the entire resin in the core and the resin coating portion.

Other Additives

As the other additives, various additives used in the powder coating material are used. Specific examples of the other additive include a surface adjusting agent (silicone oil or acrylic oligomer), a foam inhibitor (for example, benzoin or benzoin derivatives), a hardening accelerator (an amine compound, an imidazole compound, or a cationic polymerization catalyst), a plasticizer, a charge-controlling agent, an antioxidant, a pigment dispersant, a flame retardant, a fluidity-imparting agent, and the like.

Resin Coating Portion

The resin coating portion includes the thermosetting resin having the glass transition temperature of equal to or higher than 45° C. The resin coating portion may include only the thermosetting resin, or may include other resins and other additives (the thermosetting agent, and other additives which are described in the core). In order to prevent the bleed from occurring on the surface of the powder particle, the resin coating portion is preferably formed of only the resin. Even when the resin coating portion includes other additives, the resin is preferably equal to or greater than 90% by weight (preferably equal to or greater than 95% by weight) with respect to the entire resin coating portion. Further, in order to improve the storage properties of the powder coating material, the resin coating portion may be formed of only the thermosetting resin having the glass transition temperature of equal to or higher than 45° C.

Thermosetting resin having glass transition temperature of equal to or higher than 45° C.

As the thermosetting resin (hereinafter, referred to as a "high Tg thermosetting resin" in some cases) having the glass transition temperature of equal to or higher than 45° C., various types of resins which are used in the powder particle of the powder coating material in the related art may be used. The thermosetting resin is preferably a non-aqueous (hydrophobic) resin.

As the high Tg thermosetting resin, at least one type selected a group consisting of the thermosetting polyester resin and the thermosetting (meth)acrylic resin is preferable, and the thermosetting polyester resin is more preferable.

As the resin type of the thermosetting polyester resin and the thermosetting (meth)acrylic resin, the resin type which may be used as the thermosetting resin in the core is exemplified. The thermosetting resin in the resin coating portion may be the same type of the resin as the thermosetting resin in the core or may be the different type therefrom.

It is possible to control the glass transition temperature of the thermosetting resin by the density of the rigid unit such as an aromatic ring or a cyclohexane ring in the main chain of the resin. That is, when the density of the aromatic ring or the cyclohexane ring in the main chain is high, the glass transition temperature is increased, and when the density of a methylene group, an ethylene group, an oxyethylene group, or the like is high, the glass transition temperature is decreased. Further, when the density of a side chain such as aliphatic series is increased, the glass transition temperature is decreased. In consideration of this aspect, it is possible to control the glass transition temperature of the thermosetting resin.

Other Resins

The resin coating portion may include other resins other than the high Tg thermosetting resin. Here, the ratio of other resins with respect to the entire resins in the resin coating portion is preferably equal to or less than 5% by weight, and is more preferably equal to or less than 1% by weight in order to improve the storage properties of the powder coating material. However, it is preferable that the other resins are not substantially included in the powder coating material. The resin included in the resin coating portion is preferably the high Tg thermosetting resin in order to improve the storage properties of the powder coating material.

The aforementioned other resins include the non-curable resin and the thermosetting resin. The aforementioned other resins may be the thermosetting resin in order to improve the curing density (cross-linking density) of the coating film.

The thermosetting resin is preferably at least a type selected from a group consisting of the thermosetting polyester resin and the thermosetting (meth)acrylic resin. As the resin type of the thermosetting polyester resin and the thermosetting (meth)acrylic resin, the resin type which may be used as the thermosetting resin in the core is exemplified. The thermosetting resin in the resin coating portion may be the same type of the resin as the thermosetting resin in the core or may be the different type therefrom.

The non-curable resin is preferably at least a type selected from a group consisting of the polyester resin and the (meth)acrylic resin.

A coverage of the resin coating portion on the surface of the powder particle is preferably from 30% to 100% and more preferably from 50% to 100%, in order to prevent the bleed from occurring on the surface of the powder particle.

A coverage of the resin coating portion with respect to the surface of the powder particle is a value determined by X-ray photoelectron spectroscopy (XPS) measurement. Specifically, in the XPS measurement, JPS-9000MX manufactured by JEOL Ltd. is used as a measurement device, and the measurement is performed by using an MgKα ray as the X-ray source and setting an accelerating voltage to 10 kV and an emission current to 30 mA.

The coverage of the resin coating portion with respect to the surface of the powder particles is determined by peak separation of a component derived from the material of the core on the surface of the powder particles and a component derived from a material of the resin coating portion, from the spectrum obtained under the conditions described above. In the peak separation, the measured spectrum is separated into each component using curve fitting by the least square method. As the component spectrum to be the peak separation base, the spectrum obtained by singly measuring a resin of the core, a curing agent, a pigment, an additive, a resin of the resin coating portion used in preparation of the powder particle is used. In addition, the coverage is determined from a ratio of a spectral intensity derived from the resin of the resin coating portion with respect to the total of entire spectral intensity obtained from the powder particles.

The thickness of the resin coating portion is preferably from 0.2 μm to 4 μm and more preferably from 0.3 μm to 3 μm, in order to prevent the bleed from occurring on the surface of the powder particle.

The thickness of the resin coating portion is a value obtained by the following method. The powder particle is embedded in the epoxy resin, and a sliced piece is prepared by performing cutting with a diamond knife. This sliced piece is observed using a transmission electron microscope (TEM) and plural of images of the cross section of the powder particles are imaged. The thicknesses of 20 portions of the resin coating portion are measured from the images of the cross section of the powder particle, and an average value thereof is used. When it is difficult to distinguish the resin coating portion and the core in the image of the cross section due to a clear powder coating material, it is possible to easily perform the measurement by performing dyeing and observation.

The content of the entire thermosetting resin in the powder particle with respect to the entire powder particle is preferably from 20% by weight to 99% by weight, and is more preferably from 30% by weight to 95% by weight.

The content of the entire thermosetting agents in the powder particle with respect to the entire thermosetting resins in the total number of the powder particles is preferably from 1% by weight to 30% by weight, and is more preferably from 3% by weight to 20% by weight.

Aluminum Ion

It is preferable that the powder particle includes an aluminum ion in order to improve the storage properties of the powder coating material. As the valence of the metal ions is high, mesh ion cross-linking is easily formed, and it is preferable from the viewpoints of material from the viewpoint of the storage properties of the powder coating material. Due to this, the powder particle is preferable to include the metal ion with a valence of three or higher, and the aluminum ion is preferable as the metal ion.

The aluminum ion may be included in any one of the core and the resin coating portion in the powder particle. The aluminum ion forms the ion cross-linking by interacting with the carboxyl group or the hydroxyl group in the resin included in the powder particle. With the ion cross-linking, it is possible to prevent the bleed of various components from occurring on the surface of the powder particle, thereby improving the storage properties of the powder coating material. Since the bond of the ion cross-linking is broken due to the heat generated when thermosetting the ion cross-linking, there is no concern that the smoothness of the coating film is deteriorated without increasing the melt viscosity of the powder particle, even when the aluminum ion is included.

As a supply source of the aluminum ion (a compound added to the powder particle as an additive), for example, an aluminum salt, an aluminum salt polymer, and an aluminum complex are used. Among these, the aluminum salt polymer is preferable from the viewpoint of the storage properties of the powder coating material and the smoothness of the coating film.

As the aluminum salt, for example, aluminum sulfate or aluminum chloride may be used. As the aluminum salt polymer, for example, polyaluminum chloride or polyaluminum hydroxide may be used. As the aluminum complex, for example, aluminum salt of amino carbonic acid may be used. Specific examples of the aluminum complex include the aluminum salt using a well known chelate as a base such as ethylenediamine tetraacetic acid, propanediamine tetraacetic acid, nitrilotriacetic acid, triethylenetetramine hexaacetic acid, diethylenetriamine pentacetic acid, and the like.

A compound corresponding to a supply source of the aluminum ion is added to the powder particle as an aggregating agent, for example, when preparing the powder particle by an aggregation and coalescence method. Additionally, the compound is added to the powder particle as the catalyst for prompting the thermosetting reaction or as the other additives for another use.

The content of the aluminum ion is preferably from 0.002% by weight to 0.2% by weight and more preferably from 0.005% by weight to 0.15% by weight, with respect to the entire powder particle, from the viewpoints of the storage properties of the powder coating material and the smoothness of the coating film.

When the content of the aluminum ion is equal to or greater than 0.002% by weight, suitable ion cross-linking is formed by the aluminum ion, bleeding of the surface powder particles is prevented and the storage properties of the powder coating material are improved. Meanwhile, when the content of the aluminum ion is equal to or less than 0.2% by weight, the formation of excessive ion cross-linking by the aluminum ion is prevented, and the smoothness of the coating film becomes excellent.

Metal Ion

The powder particle may contain a metal ion without limiting the aluminum ion. When preparing the powder particles by an aggregation and coalescence method, the supply source of the metal ions added as an aggregating agent (metal salt or an inorganic metal salt polymer, and a metal complex) contributes to controlling the particle diameter distribution and shapes of the powder particles.

Specifically, high valence of the metal ions is preferable, in order to obtain a narrow particle diameter distribution. In addition, in order to obtain a narrow particle diameter distribution, the metal salt polymer is preferable, compared to the metal salt, even though the valences of the metal ions thereof are the same as each other. Accordingly, from the viewpoints described above, the supply source of the metal ions is preferably aluminum salt (for example, aluminum sulfate or aluminum chloride) and an aluminum salt polymer (for example, polyaluminum chloride or polyaluminum hydroxide), and particularly preferably an aluminum salt polymer (for example, polyaluminum chloride or polyaluminum hydroxide).

The content of the metal ions is preferably from 0.002% by weight to 0.2% by weight and more preferably from 0.005% by weight to 0.15% by weight. When the aggregating agent is added so that the content of the metal ions is equal to or greater than 0.002% by weight, aggregation of the resin particles in the aqueous medium proceeds, and this contributes to realization of the narrow particle diameter distribution. The aggregation of the resin particle to be the resin coating portion proceeds with respect to the aggregated particles to be the core, and this contributes to realization of the formation of the resin coating portion with respect to the entire surface of the core. Meanwhile, when the aggregating agent is added so that the content of the metal ions is equal to or smaller than 0.2% by weight, the formation of excessive creating of ion cross-linking in the aggregated particles is prevented, and the shape of the powder particles formed when performing coalescence is easily set to be close to a sphere.

The content of the metal ions in the powder particle is measured by quantitative analysis of fluorescent X-ray intensity of the powder particles. Specifically, for example, first the resin and the supply source of the metal ions are mixed with each other, and a resin mixture having a well-known concentration of the metal ions is obtained. A pellet sample is obtained with 200 mg of this resin mixture by using a tableting tool having a diameter of 13 mm. The weight of this pellet sample is precisely weighed, and the fluorescent X-ray intensity of the pellet sample is measured to obtain peak intensity. In the same manner as described above, the measurement is performed for the pellet sample with the changed added amount of the supply source of the metal ions, and a calibration curve is created with the results. The quantitative analysis of the content of the metal ions in the powder particle to be a measurement target is performed by using this calibration curve.

Examples of an adjusting method of the content of the metal ions include 1) a method of adjusting the added amount of the supply source of the metal ions, 2) in a case of preparing the powder particles by an aggregation and coalescence method, a method of adjusting the content of the metal ions by adding the aggregating agent (for example, metal salt or the inorganic metal salt polymer) as the supply source of the metal ions in an aggregation step, adding a chelating agent (for example, ethylenediamine tetraacetic acid (EDTA), diethylenetriamine pentacetic acid (DTPA), or nitrilotriacetic acid (NTA)) at a last stage of the aggregation step, forming the metal ions and a complex by the chelating agent, and removing the formed complex salt in a washing step.

External Additive

The external additive prevents the powder particles from being aggregated to each other. Specific examples of the external additive include inorganic particles. Examples of the inorganic particles include particles of $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$.

Surfaces of the inorganic particles as an external additive are preferably subjected to a hydrophobizing treatment. The hydrophobizing treatment is performed by, for example, dipping the inorganic particles in a hydrophobizing agent. The hydrophobizing agent is not particularly limited and examples thereof include a silane coupling agent, silicone oil, a titanate coupling agent, and an aluminum coupling agent. These may be used alone or in combination of two or more types thereof. Generally, the amount of the hydrophobizing agent is, for example, from 1 part by weight to 10 parts by weight with respect to 100 parts by weight of the inorganic particles.

An external additive externally added is preferably present on the surface of the powder particles, and the amount of the external additive externally added is, for example, preferably from 0.01% by weight to 5% by weight and more preferably from 0.01% by weight to 2.0% by weight, with respect to the powder particles.

Method of Preparing Powder Coating Material

Next, a method of preparing the powder coating material according to the exemplary embodiment will be described.

After preparing the powder particles, the powder coating material according to the exemplary embodiment is obtained by externally adding the external additives to the powder particles, if necessary.

The powder particles may be prepared using any of a dry preparing method (e.g., kneading and pulverizing method) and a wet preparing method (e.g., aggregation and coalescence method, suspension and polymerization method, and dissolution and suspension method). The powder particle preparing method is not particularly limited to these preparing methods, and a known preparing method is employed. As the preparing method of the powder particle, an aggregation coalescence method is preferable from the viewpoint that the volume particle diameter distribution index GSDv, and the volume average particle diameter may be easily controlled to be within the above-described range.

Specifically, the powder particle is preferably prepared by performing: a step of forming first aggregated particles by aggregating composite particles in the dispersion in which the composite particles including the thermosetting agent which has the thermosetting resin and the blocked isocyanate group are dispersed; a step of forming second aggregated particles by mixing the dispersion in which the first aggregated particles are dispersed with the dispersion in which the resin particles containing the thermosetting resin having the glass transition temperature of equal to or greater than 45° C. are dispersed, aggregating the resin particles on the surface of the first aggregated particle, and attaching the resin particles onto the surface of the first aggregated particle; and a step of heating the dispersion in which the second aggregated particles are dispersed so as to coalesce the second aggregated particles.

In the powder particle prepared by the aforementioned method, a coalesced portion of the first aggregated particles is the core, and the coalesced portion of the resin particles attached onto the surface of the first aggregated particle is the resin coating portion.

Hereinafter, the respective steps will be described in detail.

In the following description, a method of preparing powder particles containing a colorant will be described, but the colorant is only used if necessary.

Dispersion Preparation Step

First, the dispersion used in the aggregation and coalescence method is prepared. Specifically, the dispersion in which the composite particles including the thermosetting agent which has the thermosetting resin and the blocked isocyanate group are dispersed (referred to as "composite particle dispersion"), the colorant dispersion in which the colorants are dispersed, the dispersion in which the resin particles containing the thermosetting resin having the glass transition temperature of equal to or higher than 45° C. are dispersed (referred to as "resin particle dispersion").

Hereinafter, the thermosetting resin is referred to as the "resin", and the thermosetting agent is referred to as a "curing agent".

The composite particle dispersion is, for example, prepared by mixing the resin with the curing agent by the organic solvent or by heating at lower than 80° C., and then dispersing the mixture in a dispersion medium with a surfactant. When using the solvent, it is desirable to remove the solvent under the condition such that the curing agent and the resin do not cause the curing reaction after dispersion, and to select the solvent which is removable under the condition that the aforementioned curing reaction is not caused.

As the above-described dispersion, for example, an aqueous medium may be used. Examples of the aqueous medium include water such as distilled water and ion exchange water, alcohol and the like. These may be used alone or in combination of two or more types thereof.

Examples of the surfactant include anionic surfactants such as sulfuric ester sal-based, sulfonate-based, phosphate ester-based, and soap-based anionic surfactants; cationic surfactants such as amine salt-based and quaternary ammonium salt-based cationic surfactants; and nonionic surfactants such as polyethylene glycol based, alkyl phenol ethylene oxide adduct, and polyol nonionic surfactants. Among these, anionic surfactants and cationic surfactants are particularly used. Nonionic surfactants may be used in combination with anionic surfactants or cationic surfactants. The surfactants may be used alone or in combination of two or more types thereof.

As a method of dispersing the mixture of the resin and the curing agent in the dispersion medium, a common dispersing method using, for example, a rotary shearing-type homogenizer, or a ball mill, a sand mill, or a Dyno mill as media is exemplified. Depending on the types of the resin particles, the mixture of the resin and the curing agent may be dispersed, for example, through a phase inversion emulsification method.

The phase inversion emulsification method includes: dissolving the mixture of the resin and the curing agent in a hydrophobic organic solvent in which the resin and the curing agent are soluble; conducting neutralization by adding a base to an organic continuous phase (O phase); and converting the resin (so-called phase inversion) from W/O to O/W by adding an aqueous medium (W phase) to form a discontinuous phase, thereby dispersing the mixture of the resin and the curing agent as particles in the aqueous medium.

Specifically, in a case where the resin is a polyester resin, after performing heating, melting, and polycondensing a monomer constituting the polyester resin under reduced pressure, a solvent (for example, ethyl acetate) is added to and dissolved in the obtained polycondensation product, the curing agent is added and dissolved, and then the obtained solution is stirred while adding a weak alkaline aqueous solution thereto and subjected to phase inversion emulsification, thereby obtaining a dispersion in which a mixture (the composite particle) of the polyester resin particle with the curing agent is dispersed.

In a case where the resin is an acrylic resin, for example, the curing agent in the monomer constituting the acrylic resin is dissolved, the dissolved product is emulsified in an aqueous medium, and a water-soluble initiator and a chain transfer agent are added thereto and heated so as to perform emulsification and polymerization, thereby obtaining a dispersion in which the mixture of the acrylic resin with the curing agent (the composite particle) is dispersed.

In the composite particle dispersion, the volume average particle diameter of the composite particle is preferably, for example, equal to or less than 1 μm, is more preferably from 0.01 μm to 1 μm, is even more preferably from 0.08 μm to 0.8 μm, and is still more preferably from 0.1 μm to 0.6 μm.

Regarding the volume average particle diameter of the particles in the dispersion, a cumulative distribution by volume is drawn from the side of the smallest diameter with respect to particle diameter ranges (channels) separated using the particle diameter distribution obtained by the measurement of a laser diffraction-type particle diameter distribution measuring device (for example, LA-700 manufactured by Horiba, Ltd.), and a particle diameter when the cumulative percentage becomes 50% with respect to the entire particles is measured as a volume average particle diameter D50v.

The content of the composite particle included in the composite particle dispersion is preferably, for example, from 5% by weight to 50% by weight, and is more preferably from 10% by weight to 40% by weight.

The resin particle dispersion and the colorant dispersion are prepared in the same manner as the preparing method of the composite particle dispersion. That is, the dispersion medium, the surfactant, the dispersing method, the volume average particle diameter of the particle, and the content of the particles in the resin particle dispersion and the colorant dispersion are the same as those of the composite particle dispersion.

First Aggregated Particle Forming Step

Next, the composite particle dispersion and the colorant dispersion are mixed with each other. Then, the composite particle dispersion and the colorant are heterogeneously aggregated in the mixed dispersion, thereby forming the first aggregated particle including the composite particle dispersion and the colorant which have a diameter similar to a target powder particle diameter.

Specifically, for example, an aggregating agent is added to the mixed dispersion and a pH of the mixed dispersion is adjusted to be acidic (for example, the pH is from 2 to 5). If necessary, a dispersion stabilizer is added. Then, the mixed dispersion is heated at a temperature close to the glass transition temperature of the resin included in the composite particle (specifically, for example, from the glass transition temperature of the resin–30° C. to the glass transition temperature of the resin–10° of the resin) to aggregate the particles dispersed in the mixed dispersion, thereby forming the first aggregated particles.

In the first aggregated particle forming step, for example, the aggregating agent may be added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and the heating may then be performed.

Examples of the aggregating agent include a surfactant having an opposite polarity to the polarity of the surfactant used as the dispersion to be added to the mixed dispersion, metal salt, a metal salt polymer, and a metal complex. When a metal complex is used as the aggregating agent, the amount of the surfactant used is reduced and charging characteristics are improved.

After completing the aggregation, an additive for forming a bond of metal ions of the aggregating agent and a complex or a similar bond may be used, if necessary. A chelating agent is suitably used as this additive. With the addition of this chelating agent, the content of the metal ions of the powder particles may be adjusted when the aggregating agent is excessively added.

The metal salt, the metal salt polymer, or the metal complex as the aggregating agent is used as a supply source of the metal ions included in the powder coating material. These examples of the metal salt, the metal salt polymer, or the metal complex are as described above.

A water-soluble chelating agent is used as the chelating agent. Specific examples of the chelating agent include oxycarboxylic acids such as a tartaric acid, a citric acid, and a gluconic acid; and aminocarboxylic acids such as an iminodiacetic acid (IDA), nitrilotriacetic acid (NTA), and an ethylenediaminetetraacetic acid (EDTA).

The amount of the chelating agent added is, for example, preferably from 0.01 parts by weight to 5.0 parts by weight, and more preferably from 0.1 parts by weight to less than 3.0 parts by weight with respect to 100 parts by weight of the resin particles.

Second Aggregated Particle Forming Step

Next, the obtained dispersion in which the first aggregated particles are dispersed (referred to as a "first aggregated particle dispersion") and the resin particle dispersion are mixed with each other.

Then, the resin particle is aggregated to be attached onto the surface of the first aggregated particle in the mixed dispersion in which the first aggregated particle and the resin particle are dispersed, thereby forming a second aggregated particle in which the resin particle is attached onto the surface of the first aggregated particle.

Specifically, in the first aggregated particle forming step, for example, when the particle diameter of the first aggregated particles reaches a target particle diameter, the resin particle dispersion is mixed with the first aggregated particle dispersion, and the mixed dispersion is heated at a temperature equal to or lower than the glass transition temperature of the resin particles. The pH of the mixed dispersion is set to be in a range from 6.5 to 8.5, for example, and therefore the progress of the aggregation is stopped. Thus, the second aggregated particle which is aggregated so that the resin particle is attached on the surface of the first aggregated particle may be obtained.

Coalescence Step

Next, the second aggregated particle dispersion in which the second aggregated particles are dispersed is heated at, for example, a temperature that is equal to or higher than the glass transition temperature of the resin included in the composite particle and the resin included in the composite particle (for example, a temperature that is equal to or higher than the glass transition temperature by from 10° C. to 30° C.) to perform the coalescence on the second aggregated particles and form the powder particles.

The powder particles are obtained through the foregoing steps.

Herein, after the coalescence step ends, the powder particles formed in the dispersion are subjected to a washing step, a solid-liquid separation step, and a drying step, that are well known, and thus dry powder particles are obtained. In the washing step, preferably displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, airflow drying, fluidized drying, vibration-type fluidized drying, or the like is preferably performed from the viewpoint of productivity.

The powder coating material according to the exemplary embodiment is prepared by adding and mixing, for example, an external additive to the obtained dry powder particles, if necessary. The mixing is preferably performed with, for example, a V-blender, a Henschel mixer, a Lodige mixer, or the like. Furthermore, if necessary, coarse particles of the toner may be removed using a vibration sieving machine, a wind-power sieving machine, or the like.

Coated Article and Preparing Method of Coated Article

A coated article according to the exemplary embodiment is a coated article coated with the powder coating material according to the exemplary embodiment. A preparing method of the coated article according to the exemplary embodiment is a preparing method of coating the coated article with the powder coating material according to the exemplary embodiment.

Specifically, after coating a surface to be coated with the powder coating material, a coating film having the powder coating material cured by heating (burning) is formed, and accordingly the coated article is obtained. The coating and the heating (burning) of the powder coating material may be simultaneously performed.

In the coating with the powder coating material, a well-known coating method such as electrostatic powder coating, frictional charge powder coating, or fluidized dipping is used.

In the powder coating material according to the exemplary embodiment, a coating film which is excellent in the smoothness is formed even when a heating temperature (a burning temperature) is set to be equal to or lower than 150° C. Of course, the heating temperature (the burning temperature) may be set to be equal to or higher than 150° C. The heating temperature (the burning temperature) is preferably equal to or lower than 200° C., is more preferably equal to or lower than 180° C., is even more preferably equal to or lower than 150° C., is still more preferably equal to or lower than 140° C., is still more preferably equal to or lower than 130° C., is preferably equal to or higher than 90° C., is more preferably equal to or higher than 100° C., and is even more preferably equal to or higher than 120° C.

The heating time (the burning time) is adjusted depending on the heating temperature (the burning temperature).

The heating time (the burning time) is preferably equal to or longer than 20 minutes, is more preferably equal to or longer than 30 minutes, is preferably equal to or shorter than 60 minutes, and is more preferably equal to or shorter than 40 minutes.

The thickness of the coating film is preferably, for example, from 20 µm to 50 µm.

A target product to be coated with the powder coating material is not particularly limited, and various metal components, ceramic components, or resin components are used. These target products may be uncompleted products which are not yet molded to the products such as a plate-shaped product or a linear product, and may be molded products which are molded to be used in an electronic component, a road vehicle, or an interior and exterior material of a building. In addition, the target product may be a product including a surface to be coated which is subjected to a surface treatment such as a primer treatment, a plating treatment, or an electrodeposition coating, in advance.

EXAMPLES

Hereinafter, the exemplary embodiment will be described in detail using examples, but is not limited to these examples.

In the following description, unless specifically noted, "parts" is based on the weight.

Preparation of Colorant Dispersion
Preparation of Colorant Dispersion (C1)
Cyan pigment (C.I. Pigment Blue 15:3, (copper phthalocyanine) manufactured by Dainichiseika Color & Chemicals Mfg. Co., Ltd.): 100 parts Anionic surfactant (NEOGEN RK manufactured by Daiichi Kogyo Seiyaku Co., Ltd.): 15 parts
Ion exchange water: 285 parts The above described materials are mixed, dissolved, and dispersed for 1 hour by using a high pressure impact-type disperser Ultimaizer (HJP 30006, manufactured by Sugino Machine Ltd.) thereby preparing colorant dispersion (C1). The volume average particle diameter of the cyan pigment in the colorant dispersion is 0.13 µm, and the solid content ratio of the colorant dispersion is 25% by weight.

Preparation of Colorant Dispersion (M1)

The colorant dispersion (M1) is prepared in the same manner as the preparation of the colorant dispersion (C1) except that the cyan pigment is changed to a magenta pigment (a quinacridone pigment, CHROMOFINE MAGENTA 6887 manufactured by Dainichiseika Color & Chemicals Mfg. Co., Ltd.). In the colorant dispersion (M1), the volume average particle diameter of the magenta pigment is 0.14 µm, and the solid content concentration thereof is 25% by weight.

Preparation of Colorant Dispersion (M2)

The colorant dispersion (M2) is prepared in the same manner as the preparation of the colorant dispersion (C1) except that the cyan pigment is changed to the magenta pigment (FASTOGEN SUPER RED 7100Y-E manufactured by DIC Corporation). In the colorant dispersion (M2), the volume average particle diameter of the magenta pigment is 0.14 µm, and the solid content concentration thereof is 25% by weight.

Preparation of Colorant Dispersion (Y1)

The colorant dispersion (Y1) is prepared in the same manner as the preparation of the colorant dispersion (C1) except that the cyan pigment is changed to a yellow pigment (PALIOTOL YELLOW D 1155 manufactured by BASF Japan Ltd.). In the colorant dispersion (Y1), the volume average particle diameter of the yellow pigment is 0.13 µm, and the solid content concentration thereof is 25% by weight.

Preparation of Colorant Dispersion (K1)

The colorant dispersion (K1) is prepared in the same manner as the preparation of the colorant dispersion (C1) except that the cyan pigment is changed to a black pigment (REGAL 330 manufactured by Cabot Corporation). In the colorant dispersion (K1), the volume average particle diameter of the black pigment is 0.11 µm, and the solid content concentration thereof is 25% by weight.

Preparation of Colorant Dispersion (W1)
Titanium oxide (A-220 manufactured by Ishihara Sangyo Kaisha Ltd): 100 parts
Anionic surfactant (NEOGEN RK manufactured by Daiichi Kogyo Seiyaku Co., Ltd.): 15 parts
Ion exchange water: 285 parts The above described materials are mixed, and dispersed for 3 hour by using a high pressure impact-type disperser Ultimaizer (HJP 30006 manufactured by Sugino Machine Ltd.) thereby preparing colorant dispersion (W1). The volume average particle diameter of the titanium oxide in the colorant dispersion (W1) is 0.25 and the solid content concentration of the colorant dispersion is 25% by weight.

Preparation of Thermosetting Polyester Resin
Preparation of Thermosetting Polyester Resin (L1)

Polycondensation reaction is performed by adding raw materials of the following compositions into the reaction vessel which is equipped with the stirring device, the thermometer, a nitrogen gas inlet port, and a fractionator and raising a temperature up to 240° C. while stirring the materials under the nitrogen atmosphere.

Terephthalic acid: 593 parts (80 mol %)
Isophthalic acid: 148 parts (20 mol %)
Ethylene glycol: 121 parts (39 mol %)
Neopentyl glycol: 312 parts (61 mol %)
Di-n-butyl tin oxide: 0.5 parts The obtained thermosetting polyester resin obtains the following results; a glass transition temperature is 38° C., an acid value (Av) is 12 mgKOH/g, and a hydroxyl value (OHv) is 40 mgKOH/g, the weight average molecular weight is 8,000, and the number average molecular weight is 3,500.

Preparation of Thermosetting Polyester Resin (L2)

Polycondensation reaction is performed by adding raw materials of the following compositions into the reaction vessel which is equipped with the stirring device, the thermometer, a nitrogen gas inlet port, and a fractionator and raising a temperature up to 240° C. while stirring the materials under the nitrogen atmosphere.

Isophthalic acid: 741 parts (100 mol %)
Ethylene glycol: 121 parts (39 mol %)
Neopentyl glycol: 312 parts (61 mol %)
Di-n-butyl tin oxide: 0.5 parts The obtained thermosetting polyester resin obtains the following results; a glass transition temperature is 44° C., an acid value (Av) is 11 mgKOH/g, and a hydroxyl value (OHv) is 38 mgKOH/g, the weight average molecular weight is 12,000, and the number average molecular weight is 5,500.

Preparation of Thermosetting Polyester Resin (H1)

Polycondensation reaction is performed by adding raw materials of the following compositions into the reaction vessel which is equipped with the stirring device, the thermometer, a nitrogen gas inlet port, and a fractionator and raising a temperature up to 240° C. while stirring the materials under the nitrogen atmosphere.

Terephthalic acid: 742 parts (100 mol %)
Neopentyl glycol: 312 parts (62 mol %)
Ethylene glycol: 59.4 parts (20 mol %)
Glycerin: 90 parts (18 mol %)
Di-n-butyl tin oxide: 0.5 parts The obtained thermosetting polyester resin obtains the following results; a glass transition temperature is 55° C., an acid value (Av) is 8 mgKOH/g, and a hydroxyl value (OHv) is 70 mgKOH/g, the weight average molecular weight is 26,000, and the number average molecular weight is 8,000.

Preparation of Thermosetting Polyester Resin (H2)

Polycondensation reaction is performed by adding raw materials of the following compositions into the reaction vessel which is equipped with the stirring device, the thermometer, a nitrogen gas inlet port, and a fractionator and raising a temperature up to 240° C. while stirring the materials under the nitrogen atmosphere.

Terephthalic acid: 742 parts (100 mol %)
Neopentyl glycol: 312 parts (62 mol %)
Ethylene glycol: 120 parts (38 mol %)
Di-n-butyl tin oxide: 0.5 parts The obtained thermosetting polyester resin obtains the following results; a glass transition temperature is 48° C., an acid value (Av) is 11 mgKOH/g, and a hydroxyl value (OHv) is 40 mgKOH/g, the weight average molecular weight is 11,000, and the number average molecular weight is 4,100.

Example C1: Colorant Powder Coating Material (C1)

Preparation of Composite Particle Dispersion (1)

While maintaining a jacketed 3-liter reaction vessel (BJ-30N manufactured by Tokyo Rikakikai Co, Ltd.) which is equipped with a condenser, a thermometer, a water dripping device, and an anchor blade at 40° C. in a thermostat circulating water bath, a mixed solvent obtained by mixing 180 parts of acetic acid ethyl and 80 parts of isopropyl alcohol is added into the reaction vessel, and then the following compositions are added thereinto.

Thermosetting polyester resin (L1): 240 parts
Thermosetting agent (the oxime blocked isocyanate compound, VESTANAT B1358 manufactured by Evonik Industries): 60 parts)
Bismuth catalyst (bismuth carboxylate compound, K-KAT XK-640 which are manufactured by Kusumoto Chemicals, Ltd): 10 parts
Benzoin: 3 parts
Acrylic oligomer (ACRONAL 4F manufactured by BASF Japan Ltd.: 3 parts An oil phase is obtained by stirring the mixture at 150 rpm by using a three-one motor after adding the above compositions into the reaction vessel to thereby dissolve the mixture. A mixed liquid of 1 part of 10% ammonia aqueous solution and 47 parts of 5% sodium hydroxide aqueous solution is added dropwise to the oil phase which is being stirred over 5 minutes, the resultant is mixed for 10 minutes, and then 900 parts of the ion exchange water is added dropwise to the mixture at a rate of 5 parts every minute to thereby perform phase inversion, thereby obtaining an emulsion.

800 parts of the obtained emulsion and 700 parts of the ion exchange water are added into a 2-liter round-bottom flask, which is set to an evaporator (manufactured by Tokyo Rikakikai Co, Ltd.) which is provided with a vacuum control unit via a trap. The round-bottom flask is heated in a hot tub at 60° C. while being rotated, and a solvent is removed by reducing the pressure to 7 kPa with attention to bumping up the contents. The dispersion of the composite particle containing the thermosetting polyester resin and the thermosetting agent is obtained by releasing the pressure to be a normal pressure, and cooling the round-bottom flask with water when a collected amount of solvents becomes 1,100 parts. The obtained dispersion has no smell of solvent.

Thereafter, 2% of an anionic surfactant (DOWFAX 2A1 manufactured by Dow Chemical Company, an amount of active ingredient: 45%) is added to the amount of the resin in the dispersion as an active component and mixed, and then the ion exchange water is added thereto, such that the solid content concentration is adjusted to 20%. The resultant is referred to as the composite particle dispersion (1). The volume average particle diameter of the composite particle in the composite particle dispersion (1) is 150 nm.

Preparation of Thermosetting Polyester Resin Particle Dispersion (H1)

The thermosetting polyester resin particle dispersion (H1) is obtained in the same manner in the preparation of the composite particle dispersion (1) except that 240 parts of the thermosetting polyester resin (L1) is changed to 300 parts of the thermosetting polyester resin (H1).

Preparation of Colored Powder Coating Material (C1)

Aggregating Step

Composite particle dispersion (1): 325 parts (65 parts of solid content)
Colorant dispersion (C1): 3 parts (0.75 parts of the solid content)
Colorant dispersion (W1): 150 parts (37.5 parts of the solid content)

The above materials are sufficiently mixed and dispersed in a round-bottom stainless steel flask by using a homogenizer (ULTRA-TURRAX T50 manufactured by IKA Ltd.). Then, the pH is adjusted to 2.5 with 1.0% nitric acid aqueous solution. 0.50 parts of 10% polyaluminum chloride aqueous solution is added into the flask and a dispersing operation is continuously performed with the ULTRA-TURRAX.

A stirring device and a mantle heater are installed in the round-bottom stainless steel flask, and the temperature is raised to 50° C. and is kept for 15 minutes at 50° C. while the rotation rate of the stirring device is properly adjusted so that slurries are sufficiently stirred. Thereafter, at the time when the volume average particle diameter becomes 5.5 μm, 100 parts (20 parts of the solid content) of the thermosetting polyester resin particle dispersion (H1) is slowly put into the flask.

Fusion and Coalescence Step

The resultant is kept for 30 minutes after putting the thermosetting polyester resin particle dispersion (H1), and then the pH is adjusted to 6.0 with 5% of sodium hydroxide aqueous solution. Thereafter, the temperature is increased up to 85° C. and is kept for 2 hour. The shape of the particles in the dispersion is confirmed to be formed into an approximately spherical shape by using an optical microscope.

Filtering Step, Washing Step, and Drying Step

After the coalescence step is finished, the solution in the flask is cooled and filtered so as to obtain a solid content. Next, after this solid content is sufficiently washed with the ion exchange water, the solid-liquid separation is performed through the Nutsche-type suction filtration so as to obtain the solid content again. Subsequently, this solid content is redispersed in 3 liters of the ion exchange water at 40° C., and then is washed by stirring the solid content at 300 rpm for 15 minutes. This washing operation is repeatedly performed times, and the solid content obtained through the solid-liquid separation by using the Nutsche-type suction filtration is vacuum dried for 12 hours to thereby a dried solid content. This is referred to as a colorant powder particle (C1). The properties of the obtained colorant powder particle (C1) are shown in Table 1.

After embedding the colorant powder particle (C1) in the epoxy resin and then slicing the colorant powder particle, the cross section of the powder particle is observed using a transmission electron microscope, and it is confirmed that the powder particle includes the resin coating portion.

Addition of External Additive

A colorant powder coating material (C1) is obtained by mixing 0.5 parts of a hydrophobic silica particle (the primary particle diameter of 16 nm) as an external additive with 100 parts of the colorant powder particle (C1).

Example C2: Colorant Powder Coating Material (C2)

A composite particle dispersion (2) having a volume average particle diameter of 155 nm is obtained in the same manner as in Example C1 except that the thermosetting polyester resin (L1) is changed to the thermosetting polyester resin (L2), and the amount of bismuth catalyst is changed to be 20 parts in the preparation of the composite particle dispersion (1) in Example C1. In addition, the colorant powder particle (C2) and the colorant powder coating material (C2) are obtained in the same manner as in Example C1 except that the composite particle dispersion (1) is changed to the composite particle dispersion (2) in the aggregating step in Example C1. The properties of the colorant powder particle (C2) are shown in Table 1.

Example C3: Colorant Powder Coating Material (C3)

A colorant powder particle (C3) and a colorant powder coating material (C3) are obtained in the same manner as in Example C2 except that the amount of the polyaluminum chloride aqueous solution is changed to 1.0 part in the aggregating step in Example C2. The properties of the colorant powder particle (C3) are shown in Table 1.

Example C4: Colorant Powder Coating Material (C4)

A colorant powder particle (C4) and a colorant powder coating material (C4) are obtained in the same manner as in Example C1 except that the amount of the thermosetting polyester resin particle dispersion (H1) is changed to be 200 parts in the aggregating step in Example C1. The properties of the colorant powder particle (C4) are shown in Table 1.

Example C5: Colorant Powder Coating Material (C5)

A thermosetting polyester resin particle dispersion (H2) is obtained in the same manner as in Example C1 except that the thermosetting polyester resin (H1) is changed to the thermosetting polyester resin (H2), and the bismuth catalyst is changed to 10 parts of the tin catalyst (UL-22 manufactured by Momentive Performance Materials Inc.) in the preparation of thermosetting polyester resin particle dispersion (H1) in Example C1. In addition, the colorant powder particle (C5) and the colorant powder coating material (C5) are obtained in the same manner as in Example C1 except that the amount of the polyaluminum chloride aqueous solution is changed to be 0.01 parts, and the thermosetting polyester resin particle dispersion (H1) is changed to the thermosetting polyester resin particle dispersion (H2) in the aggregating step in Example C1. The properties of the colorant powder particle (C5) are shown in Table 1.

Example M1: Colorant Powder Coating Material (M1)

A colorant powder particle (M1) and a colorant powder coating material (M1) are obtained in the same manner as in Example C1 except that the colorant dispersion (C1) is changed to the colorant dispersion (M1) in the aggregating step in Example C1. The properties of the colorant powder particle (M1) are shown in Table 1.

Example M2: Colorant Powder Coating Material (M2)

A colorant powder particle (M2) and a colorant powder coating material (M2) are obtained in the same manner as in Example C1 except that the colorant dispersion (C1) is changed to the colorant dispersion (M2) in the aggregating step in Example C1. The properties of the colorant powder particle (M2) are shown in Table 1.

Example Y1: Colorant Powder Coating Material (Y1)

A colorant powder particle (Y1) and a colorant powder coating material (Y1) are obtained in the same manner as in Example C1 except that the colorant dispersion (C1) is changed to the colorant dispersion (Y1) in the aggregating step in Example C1. The properties of the colorant powder particle (Y1) are shown in Table 1.

Example K1: Colorant Powder Coating Material (K1)

A colorant powder particle (K1) and a colorant powder coating material (K1) are obtained in the same manner as in Example C1 except that the colorant dispersion (C1) is changed to the colorant dispersion (K1) in the aggregating step in Example C1. The properties of the colorant powder particle (K1) are shown in Table 1.

Comparative Example 1: Colorant Powder Coating Material (XC1)

A colorant powder particle (XC1) and a colorant powder coating material (XC1) are obtained in the same manner as in Example C1 except that the amount of the composite particle dispersion (1) is changed to 400 parts, and 100 parts of the thermosetting polyester resin particle dispersion (H1) is not added. The properties of the colorant powder particle (XC1) are shown in Table 1.

It is confirmed that the powder particle does not include the resin coating portion by observing the cross section of the powder particle using a transmission electron microscope after embedding the colorant powder particle in the epoxy resin, and then slicing the colorant powder particle.

Comparative Example 2: Colorant Powder Coating Material (XC2)

A thermosetting polyester resin particle dispersion (L1) is obtained in the same manner as in Example C1 except that the thermosetting polyester resin (H1) is changed to the thermosetting polyester resin (L1), and the thermosetting agent is not added in the preparation of the thermosetting polyester resin particle dispersion (H1) in Example C1. In addition, a colorant powder particle (XC2) and a colorant powder coating material (XC2) are obtained in the same manner as in Example C1 except that the thermosetting polyester resin particle dispersion (H1) is changed to the thermosetting polyester resin particle dispersion (L1) in the aggregating step in Example C1. The properties of the colorant powder particle (XC2) are shown in Table 1.

Comparative Example 3: Colorant Powder Coating Material (XC3)

A colorant powder particle (XC3) and the colorant powder coating material (XC3) is obtained in the same manner as in Example C1 except that the amount of the polyaluminum chloride aqueous solution is changed to be 0.05 parts in the aggregating step in Example C1. The properties of the colorant powder particle (XC3) are shown in Table 1.

Comparative Example 4: Colorant Powder Coating Material (XC4)

A colorant powder particle (XC4) and a colorant powder coating material (XC4) are obtained in the same manner as in Example C1 except that the condition of being kept at 85° C. for 2 hours is changed to the condition of being kept at 80° C. for 2 hours in the coalescence step in Example C1. The properties of the colorant powder particle (XC4) are shown in Table 1.

Comparative Example 5: Colorant Powder Coating Material (XC5)

A colorant powder particle (XC5) and a colorant powder coating material (XC5) are obtained in the same manner as in Example C1 except that the composite particle dispersion (1) is changed to the thermosetting polyester resin particle dispersion (H1) in the aggregating step Example C1. The properties of the colorant powder particle (XC5) are shown in Table 1.

Comparative Example 6: Colorant Powder Coating Material (XC6)

A colorant powder particle (XC6) and a colorant powder coating material (XC6) are obtained in the same manner as in Example C1 except that the thermosetting agent is changed to VESTAGON B1530 (Epsilon-caprolactam block) manufactured by Evonik, and the amount of the bismuth catalyst is changed to be 3 parts in the preparation of the composite particle dispersion (1) in Example C1. The properties of the colorant powder particle (XC6) are shown in Table 1.

Evaluation

Preparation of Coating Film Sample

The powder coating materials obtained in the respective Examples are coated on a test panel of ZINC phosphate treated steel plate through an electrostatic spray painting, and are burned at a heating temperature at 130° C. for a heating time 30 minutes or 60 minutes, thereby obtaining a coating film sample. A coating amount of the powder coating material is set to be an amount corresponding to the coating film having the thickens of 30 μm.

Smoothness of Coating Film

A waviness center line average $W_{CA}$ (unit: μm) of the surface of the coating film sample is measured by using a surface roughness measuring device (SURFCOM 1400A manufactured by Tokyo Seimitsu Co., Ltd.). As a value of $W_{CA}$ becomes greater, the smoothness is deteriorated, and thus the value of $W_{CA}$ is preferably 0.2 μm or less. In Table 1, a case where the value of $W_{CA}$ is equal to or less than 0.2 is indicated by "Good", and in a case where the value of the $W_{CA}$ exceeds 0.2 is indicated by "poor".

Adhesive Properties of Coating Film

A cross-cut test is performed with respect to the surface of the coating film sample based on JIS K5600-5-6 (1999), and the adhesive properties of the coating film are evaluated. An interval of the cut is set to be 1 mm. In cross-cut portions, when the portion which is affected does not exceed 15% is indicated by "good", and the portion which is not affected is equal to or greater than 15% is indicated by "poor".

Solvent Resistance of Coating Film

After dipping the coating film sample in a methyl ethyl ketone solution at a temperature at 23° C.±2° C. for 10 minutes, the sample is washed with flowing water, and the water is removed with absorbing paper. Then, the surface of the sample is evaluated by observing with naked eyes.

G0: Not changed
G1: Blistering and peeling are very slightly seen
G2: Blistering and peeling are clearly seen, and do not exceed 10% of a sample area
G3: Blistering and peeling are clearly seen, and exceed 10% of a sample area G4: Blistering and peeling are clearly seen, and exceed 50% of a sample area G5: Blistering and peeling occur across the entire surface.

There is practically no problem as long as it is G0 and G1 among the aforementioned grades. In Table 1, a case of G0 or G1 is indicated by "Good", and other cases are indicated by "Poor".

Storage Properties of Powder Coating Material

After storing the powder coating material obtained in each example for 17 hours in a thermo-hygrostat bath in which the temperature is controlled to 50° C. and humidity is controlled to 50 RH %, an amount passing through 200 mesh (aperture of 75 microns) is examined by using a vibration screen, and then the evaluation is performed based on the following evaluation criteria.

G1: passed amount is equal to or greater than 90% by weight

NG: passed amount is less than 90% by weight

There is practically no problem as long as it is G1 among the aforementioned grades. In Table 1, a case of G1 is indicated by "Good", and other cases are indicated by "Poor".

The specification and evaluation results of the respective examples are shown in the list of Table 1.

TABLE 1

| | | | Comp. Example 1 | Comp. Example 2 | Comp. Example 3 | Comp. Example 4 | Comp. Example 5 | Comp. Example 6 | Example C1 | Example C2 |
|---|---|---|---|---|---|---|---|---|---|---|
| | Tg [° C.] of thermosetting resin included in resin coating portion | | No resin coating portion | 38 | 55 | 55 | 55 | 55 | 55 | 55 |
| | Tg [° C.] of thermosetting resin included in core | | 38 | 38 | 38 | 38 | 55 | 38 | 38 | 44 |
| | Types of catalysts included in core (content with respect to particles [% by weight]) | | Bi (1.3) | Bi (1.3) | Bi (1.5) | Bi (1.5) | Bi (1.5) | Bi (1.0) | Bi (1.6) | Bi (4.2) |
| Properties of powder particle | D50v [μm] | | 6.1 | 6.5 | 5.8 | 6.5 | 6.0 | 6.1 | 6.5 | 6.6 |
| | GSDv | | 1.22 | 1.23 | 1.55 | 1.23 | 1.23 | 1.22 | 1.24 | 1.21 |
| | Average circularity | | 0.98 | 0.99 | 0.99 | 0.94 | 0.96 | 0.98 | 0.98 | 0.99 |
| | Melting temperature [° C.] | | 91 | 90 | 101 | 101 | 121 | 101 | 101 | 105 |
| | Exothermic peak in DSC [° C.] | | 81 | 81 | 82 | 82 | 98 | 165 | 82 | 85 |
| | Content of Aluminum ion [mass %] | | 0.1 | 0.09 | 0.008 | 0.1 | 0.1 | 0.1 | 0.1 | 0.09 |
| Evaluation | Smoothness | Burning for 30 minutes | Good | Good | Poor | Poor | Poor | Good | Good | Good |
| | | Burning for 60 minutes | Good | Good | Poor | Poor | Poor | Good | Good | Good |
| | Adhesiveness | Burning for 30 minutes | Good | Poor | Poor | Good | Good | Poor | Good | Good |
| | | Burning for 60 minutes | Good | Poor | Poor | Good | Good | Poor | Good | Good |
| | Solvent resistance | Burning for 30 minutes | Good | Poor | Poor | Good | Good | Poor | Good | Good |
| | | Burning for 60 minutes | Good | Poor | Poor | Good | Good | Poor | Good | Good |
| | Storage properties | | Poor | Poor | Poor | Good | Good | Good | Good | Good |
| | | | Example C3 | Example C4 | Example C5 | Example M1 | Example M2 | Example Y1 | Example K1 | |
| | Tg [° C.] of thermosetting resin included in resin coating portion | | 55 | 55 | 48 | 55 | 55 | 55 | 55 | |
| | Tg [° C.] of thermosetting resin included in core | | 44 | 38 | 38 | 38 | 38 | 38 | 38 | |
| | Types of catalysts included in core (content with respect to particles [% by weight]) | | Bi (3.2) | Bi (1.0) | Sn (1.3) | Bi (1.6) | Bi (1.6) | Bi (1.6) | Bi (1.6) | |
| Properties of powder particle | D50v [μm] | | 6.0 | 6.9 | 6.0 | 6.3 | 6.6 | 6.7 | 6.4 | |
| | GSDv | | 1.20 | 1.30 | 1.40 | 1.23 | 1.22 | 1.24 | 1.22 | |
| | Average circularity | | 0.99 | 0.96 | 0.97 | 0.98 | 0.98 | 0.96 | 0.98 | |
| | Melting temperature [° C.] | | 108 | 115 | 93 | 101 | 99 | 103 | 98 | |
| | Exothermic peak in DSC [° C.] | | 85 | 140 | 82 | 82 | 83 | 82 | 81 | |
| | Content of Aluminum ion [mass %] | | 0.2 | 0.1 | 0.002 | 0.1 | 0.10 | 0.12 | 0.09 | |
| Evaluation | Smoothness | Burning for 30 minutes | Good | Good | Good | Good | Good | Good | Good | |
| | | Burning for 60 minutes | Good | Good | Good | Good | Good | Good | Good | |
| | Adhesiveness | Burning for 30 minutes | Good | Good | Good | Good | Good | Good | Good | |
| | | Burning for 60 minutes | Good | Good | Good | Good | Good | Good | Good | |

TABLE 1-continued

| | | | | | | | | |
|---|---|---|---|---|---|---|---|---|
| Solvent resistance | Burning for 30 minutes | Good | Good | Good | Good | Good | Good | Good |
| | Burning for 60 minutes | Good | Good | Good | Good | Good | Good | Good |
| Storage properties | | Good | Good | Good | Good | Good | Good | Good |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material comprising powder particles that include:
    a core which contains a thermosetting polyester resin, a thermosetting agent having a blocked isocyanate group, and a catalyst selected from the group consisting of a bismuth catalyst and a tin catalyst, and
    a resin coating portion which contains a thermosetting polyester resin having a glass transition temperature of equal to or higher than 45° C. and coats a surface of the core,
    and that satisfy the following (1) to (5):
    (1) a volume particle diameter distribution index GSDv of the powder particles is equal to or less than 1.50;
    (2) an average circularity of the powder particles is equal to or greater than 0.96;
    (3) a melting temperature of the powder particles measured according to a ½ method by using a flow tester is from 90° C. to 115° C.;
    (4) an exothermic peak is within a range of from 80° C. to 150° C. in a differential scanning calorimetry measurement of the powder particles; and
    (5) a volume average particle diameter D50v of the powder particles is from 1 μm to 6.9 μm,
    wherein the thermosetting agent is a uretdione-bonded type isocyanate compound.

2. The thermosetting powder coating material according to claim 1,
    wherein a total content of the catalyst with respect to the entire powder particles is from 0.3% by weight to 5% by weight.

3. The thermosetting powder coating material according to claim 1,
    wherein the thermosetting polyester resin contained in the core contains an active hydroxyl group in an amount of from $2.5 \times 10^{-4}$ mol/g to $1.5 \times 10^{-3}$ mol/g.

4. The thermosetting powder coating material according to claim 1,
    wherein a number average molecular weight of the thermosetting polyester resin contained in the core is from 3,500 to 7,000.

5. The thermosetting powder coating material according to claim 1,
    wherein a content of the thermosetting resin in the core is from 20% by weight to 99% by weight.

6. The thermosetting powder coating material according to claim 1,
    wherein the powder particles contain an aluminum ion.

7. The thermosetting powder coating material according to claim 6,
    wherein a content of the aluminum ion is from 0.002% by weight to 0.02% by weight with respect to the entire powder particles.

8. The thermosetting powder coating material according to claim 1,
    wherein a coverage of the resin coating portion which coats the surface of the core is from 30% to 100%.

9. The thermosetting powder coating material according to claim 1,
    wherein a thickness of the resin coating portion is from 0.2 μm to 4 μm.

10. The thermosetting powder coating material according to claim 1,
    wherein the thermosetting agent having the blocked isocyanate group causes an uretdione group to be decomposed in a temperature range of from 80° C. to 150° C.

11. The thermosetting powder coating material according to claim 1,
    wherein the core further contains a colorant, and a content of the colorant contained in the core is from 1% by weight to 70% by weight with respect to the entire resin in the core and the resin coating portion.

12. The thermosetting powder coating material according to claim 1,
    wherein an external additive is present on the surface of the powder particles and an amount of the external additive is from 0.01% by weight to 5% by weight with respect to the powder particles.

13. A coated article that is coated with the thermosetting powder coating material according to claim 1.

14. The thermosetting powder coating material according to claim 1, wherein a glass transition temperature of the thermosetting polyester resin contained in the core is equal to or lower than 60° C.

15. The thermosetting powder coating material according to claim 14, wherein the glass transition temperature of the thermosetting polyester resin contained in the core is from 38° C. to 60° C.

16. The thermosetting powder coating material according to claim 1, wherein:
    the thermosetting powder coating material further comprises an external additive, and
    the powder particles further comprise an aluminum ion.

17. A thermosetting powder coating material comprising powder particles that include:
    a core which contains a thermosetting polyester resin having a glass transition temperature equal to or lower than 60° C., a thermosetting agent having a blocked isocyanate group, an aluminum ion, and a catalyst selected from the group consisting of a bismuth catalyst and a tin catalyst, and
    a resin coating portion which contains a thermosetting polyester resin having a glass transition temperature of equal to or higher than 45° C. and coats a surface of the core, and that satisfy the following (1) to (5):
(1) a volume particle diameter distribution index GSDv of the powder particles is equal to or less than 1.50;
(2) an average circularity of the powder particles is equal to or greater than 0.96;
(3) a melting temperature of the powder particles measured according to a ½ method by using a flow tester is from 90° C. to 115° C.;
(4) an exothermic peak is within a range of from 80° C. to 150° C. in a differential scanning calorimetry measurement of the powder particles; and
(5) a volume average particle diameter D50v of the powder particles is from 1 μm to 6.9 μm.

* * * * *